United States Patent
Kim

(10) Patent No.: US 10,724,453 B2
(45) Date of Patent: Jul. 28, 2020

(54) VALVE OPENING CONTROL APPARATUS AND METHOD OF GASOLINE EGR SYSTEM

(71) Applicants: HYUNDAI MOTOR COMPANY, Seoul (KR); KIA MOTORS CORPORATION, Seoul (KR)

(72) Inventor: Han Sang Kim, Ansan-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/210,577

(22) Filed: Dec. 5, 2018

(65) Prior Publication Data
US 2020/0063677 A1    Feb. 27, 2020

(30) Foreign Application Priority Data
Aug. 23, 2018 (KR) .................. 10-2018-0098423

(51) Int. Cl.
*F02D 41/00* (2006.01)
*F02M 26/47* (2016.01)
(Continued)

(52) U.S. Cl.
CPC ..... *F02D 41/0077* (2013.01); *F02D 41/0072* (2013.01); *F02M 26/06* (2016.02);
(Continued)

(58) Field of Classification Search
CPC . F02D 41/0077; F02D 41/0072; F02M 26/51; F02M 26/06; F02M 26/35; F02M 26/47
See application file for complete search history.

(56) References Cited

U.S. PATENT DOCUMENTS

| 4,756,155 A | * | 7/1988 | Shinzawa | ............... F01N 3/023 60/278 |
| 5,027,781 A | * | 7/1991 | Lewis | ............... F02M 26/55 123/568.11 |

(Continued)

FOREIGN PATENT DOCUMENTS

KR    10-2016-0048901 A    5/2016

*Primary Examiner* — Hung Q Nguyen
*Assistant Examiner* — Brian P Monahon
(74) *Attorney, Agent, or Firm* — Morgan, Lewis & Bockius LLP

(57) ABSTRACT

The present disclosure relates to a valve opening control apparatus and method of a gasoline EGR system. The valve opening control apparatus includes a gasoline engine generating driving power through combustion, an intake line through which an intake gas flows into a combustion chamber of the gasoline engine, an exhaust line through which an exhaust gas is discharged from the combustion chamber, a recirculation line branched off from the exhaust line and connected to the intake line, an EGR cooler, positioned in the recirculation line, cooling the exhaust gas flowing in the intake line, an EGR valve configured to control an amount of the exhaust gas flowing in the intake line, an emergency (EM) filter positioned in one end of the EGR valve, and a flow rate regulator configured to control an opening amount of the EGR valve according to a clogging state of the EM filter.

12 Claims, 6 Drawing Sheets

(51) Int. Cl.
*F02M 26/06* (2016.01)
*F02M 26/51* (2016.01)
*F02M 26/35* (2016.01)

(52) U.S. Cl.
CPC ............ *F02M 26/35* (2016.02); *F02M 26/47* (2016.02); *F02M 26/51* (2016.02)

(56) References Cited

U.S. PATENT DOCUMENTS

| | | | | |
|---|---|---|---|---|
| 5,983,874 A * | 11/1999 | Suzuki | ............... | F02D 41/008 123/673 |
| 6,948,475 B1 * | 9/2005 | Wong | ............... | F02B 43/00 123/299 |
| 7,121,081 B2 * | 10/2006 | Wirkus | ............... | F02M 26/35 60/282 |
| 2004/0006978 A1 * | 1/2004 | Beck | ............... | F01N 3/021 60/289 |
| 2006/0112679 A1 * | 6/2006 | Kojima | ............... | F02D 41/0055 60/278 |
| 2007/0107705 A1 * | 5/2007 | Hoke | ............... | F02M 25/0854 123/568.11 |
| 2008/0046128 A1 * | 2/2008 | Sasaki | ............... | F02D 35/026 700/274 |
| 2009/0133385 A1 * | 5/2009 | Ono | ............... | F01N 9/002 60/277 |
| 2010/0031938 A1 * | 2/2010 | Lim | ............... | F02M 26/16 123/568.17 |
| 2010/0108045 A1 * | 5/2010 | Enomoto | ............... | F02B 37/10 123/674 |
| 2010/0242581 A1 * | 9/2010 | Morikawa | ............... | F02D 41/1497 73/114.49 |
| 2010/0268442 A1 * | 10/2010 | Kabashima | ............... | F02D 41/0025 701/103 |
| 2011/0023847 A1 * | 2/2011 | Gates | ............... | F02D 41/0072 123/568.21 |
| 2012/0037134 A1 * | 2/2012 | Jankovic | ............... | F02D 41/0002 123/568.21 |
| 2012/0137680 A1 * | 6/2012 | Nam | ............... | F02B 39/16 60/605.2 |
| 2012/0279200 A1 * | 11/2012 | Nam | ............... | F02M 25/0227 60/273 |
| 2012/0312001 A1 * | 12/2012 | Nam | ............... | F02D 41/0072 60/299 |
| 2012/0312283 A1 * | 12/2012 | Nam | ............... | F02D 41/0065 123/568.11 |
| 2013/0269662 A1 * | 10/2013 | Kuhn | ............... | F02D 41/1448 123/568.11 |
| 2013/0291520 A1 * | 11/2013 | Schiavone | ............... | F02D 41/029 60/274 |
| 2015/0308388 A1 * | 10/2015 | Castano Gonzalez | ............... | F28D 7/16 123/568.12 |
| 2016/0061101 A1 * | 3/2016 | Nam | ............... | F02M 26/08 60/599 |

* cited by examiner

[FIG. 1]
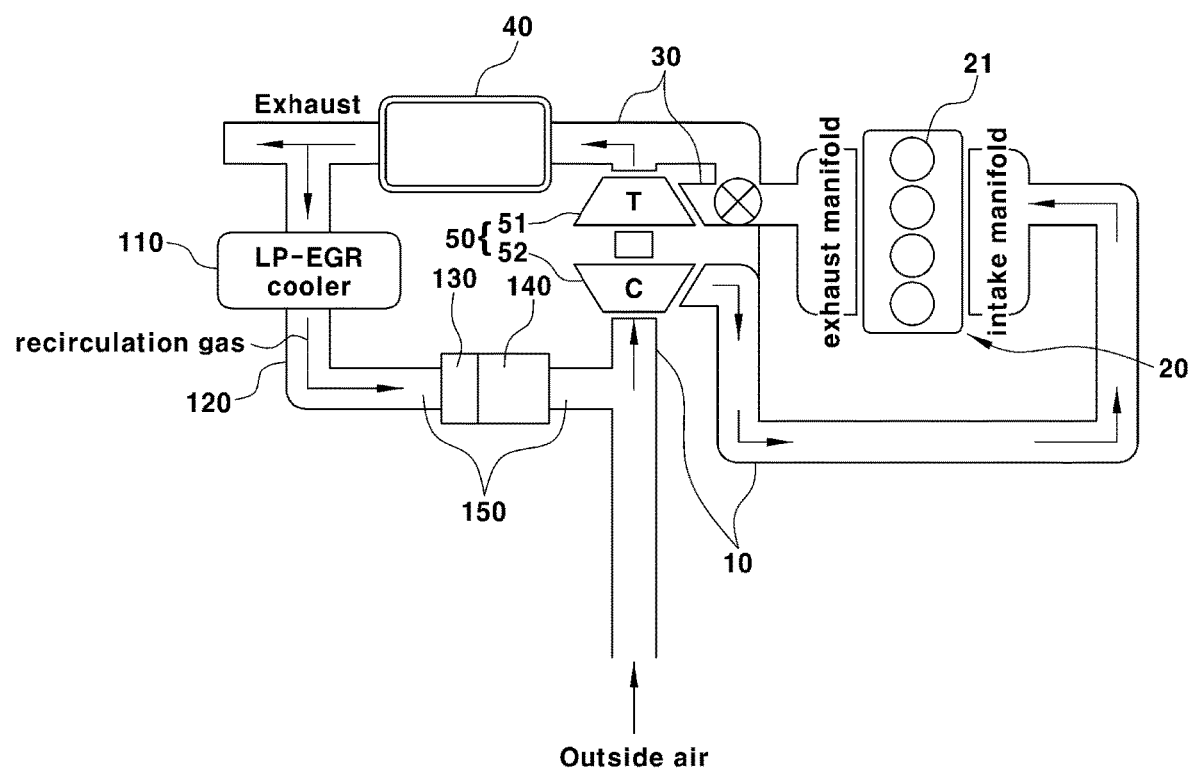

[FIG. 2]
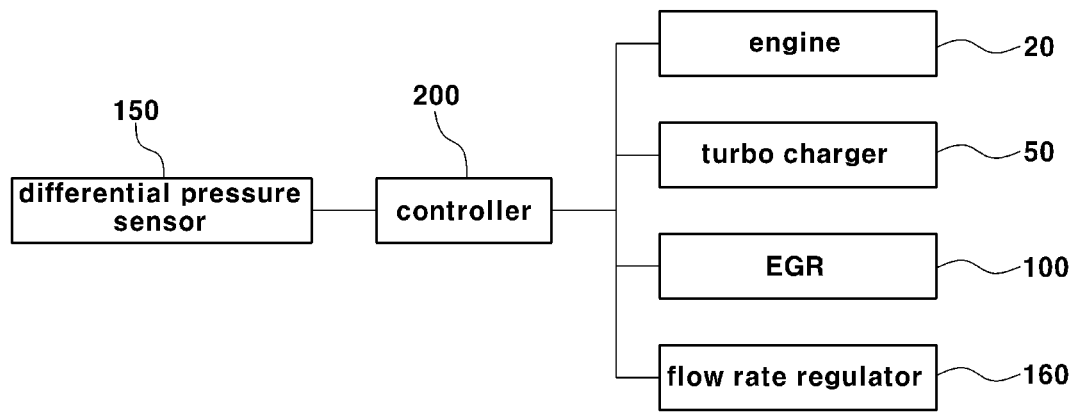
[FIG. 3]
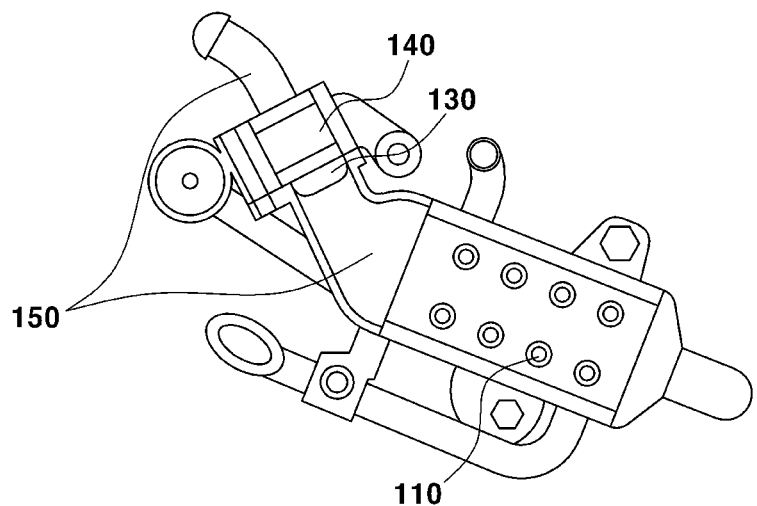

[FIG. 4]
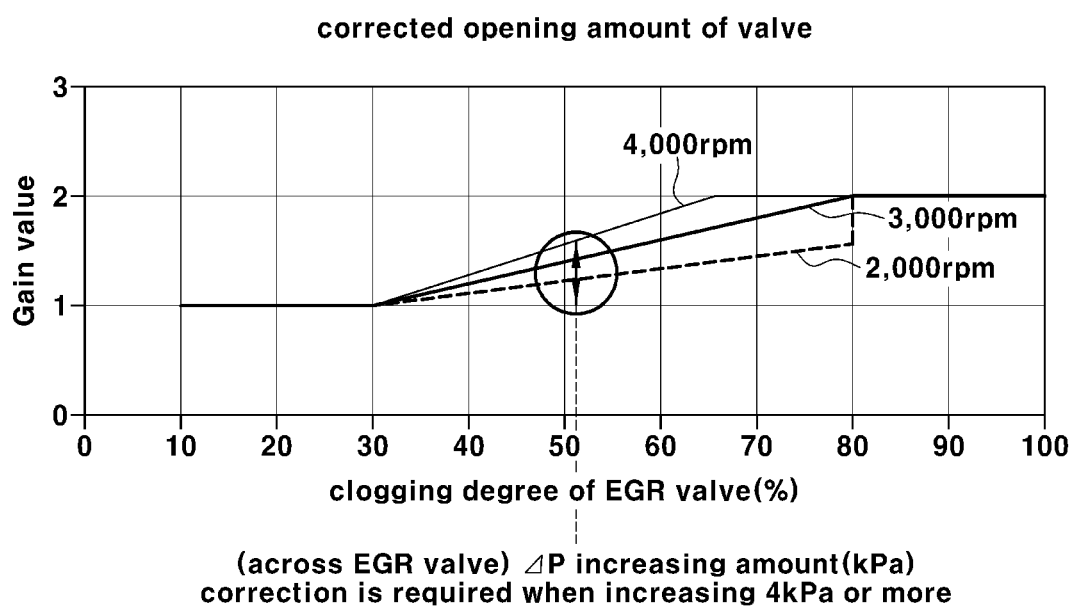

[FIG. 5]
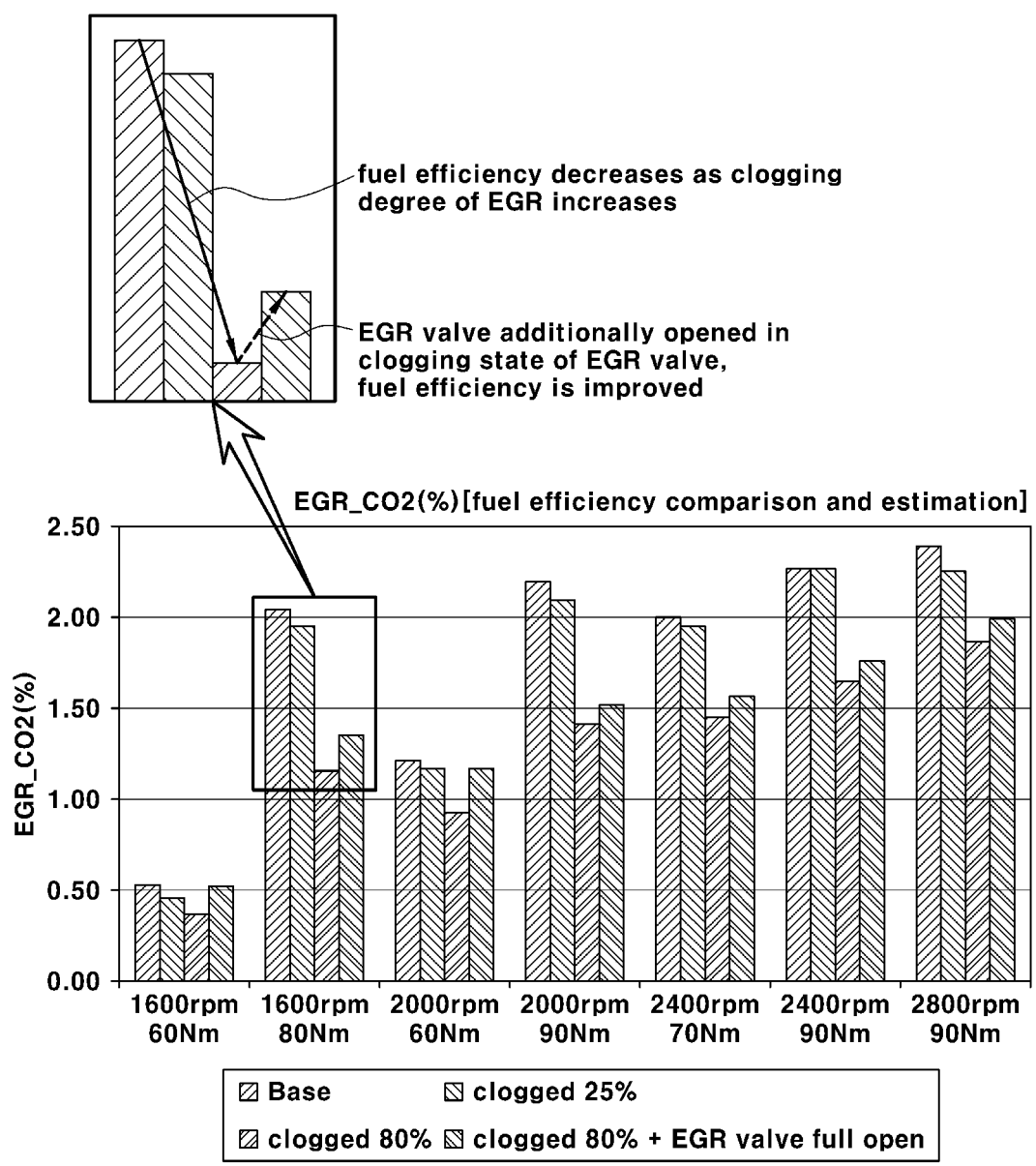

[FIG. 6]
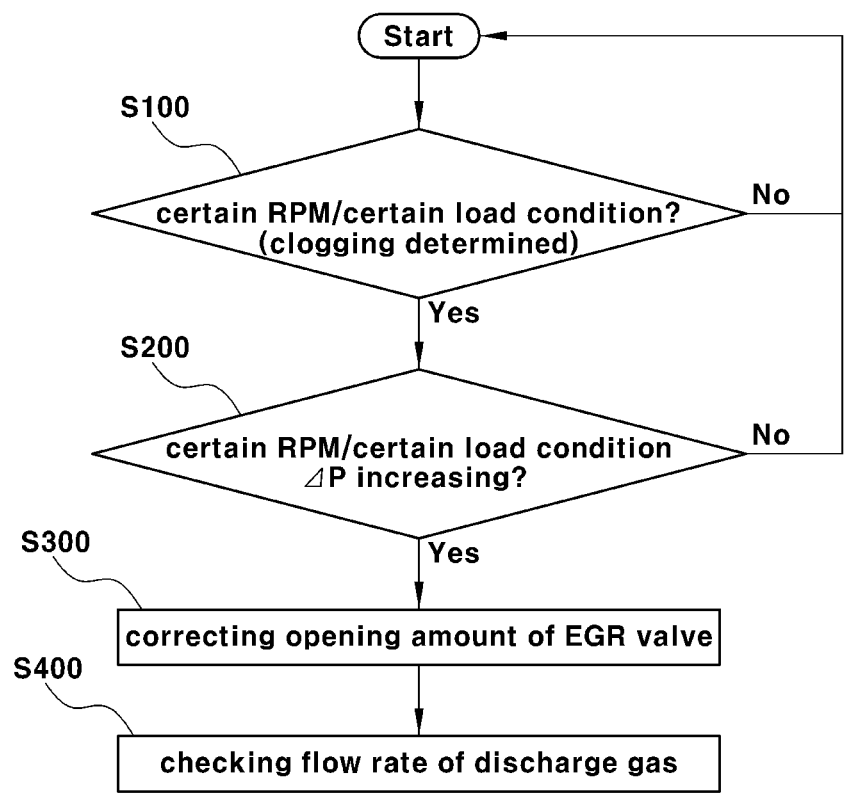

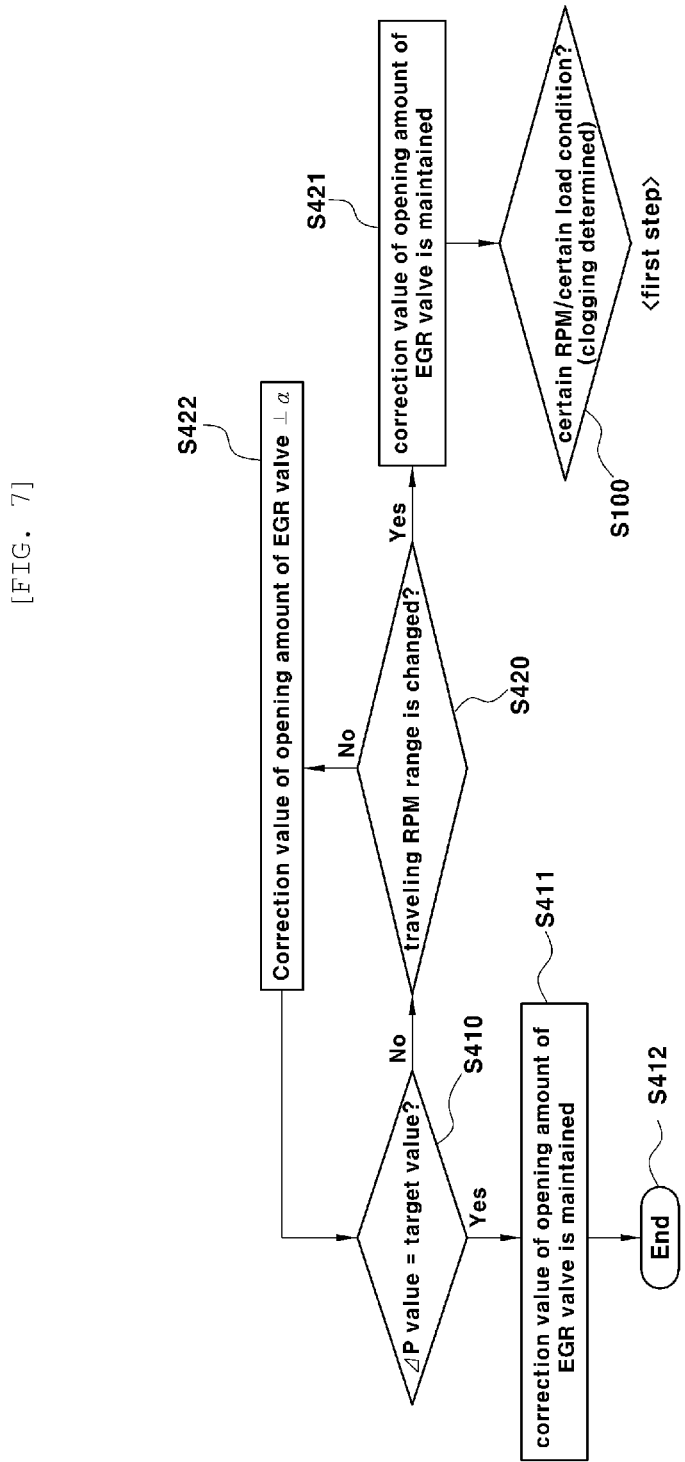
[FIG. 7]

VALVE OPENING CONTROL APPARATUS AND METHOD OF GASOLINE EGR SYSTEM

CROSS REFERENCE TO RELATED APPLICATION

The present application claims priority to Korean Patent Application No. 10-2018-0098423, filed Aug. 23, 2018, the entire contents of which is incorporated herein for all purposes by this reference.

BACKGROUND OF THE INVENTION

The present disclosure relates generally to a valve opening control apparatus and method of controlling a gasoline exhaust gas recirculation (EGR) system and, more particularly, to a valve opening control apparatus and method of controlling a gasoline EGR system in which a flow rate of an exhaust gas to be flow in an intake line is controlled by controlling an opening amount of an EGR valve according to a clogging state of an emergency (EM) filter fluidly connected to a recirculation line located at a rear end of a turbocharger, in a gasoline engine vehicle including the gasoline EGR system.

BACKGROUND

The engine of a vehicle generates power by mixing the air introduced from the outside with the fuel at an appropriate ratio and then burning the mixture.

In the process of generating power by driving the engine, it is necessary to supply the external air sufficiently for combustion in order to acquire the desired output and combustion efficiency. For this purpose, a turbocharger is used as a device for supercharging the combustion air to increase the combustion efficiency of the engine.

Generally, the turbocharger is a device that rotates the turbine using the pressure of exhaust gas discharged from the engine, and then supplies high-pressure air to a combustion chamber by using the rotational force thereby increasing the output of the engine. The turbocharger is applied to both diesel and gasoline engines.

In addition, an exhaust gas recirculation (EGR) system is mounted on a vehicle to reduce harmful exhaust gas. Generally, NOx is increased when the proportion of air in the mixer is high so that the combustion occurs well. Therefore, the EGR system is a system that mixes a part (for example, 5 to 20%) of the exhaust gas discharged from the engine back into the mixer again to reduce the amount of oxygen in the mixer and disturb combustion, thereby suppressing the generation of NOx.

An EGR system for gasoline engine is mounted on vehicles in order to improve fuel efficiency. A pumping loss can be reduced in the low speed/low load region through the EGR system and the ignition timing can be advanced by reducing the temperature of the combustion chamber in the middle speed/heavy load region, thereby improving fuel efficiency of a vehicle.

A typical EGR system used in a gasoline engine includes a low pressure EGR system. The low pressure EGR system recirculates the exhaust gas passing through the turbine of the turbocharger to an intake passage at the front end of the compressor.

Further, the low pressure EGR system used in the gasoline engine includes an emergency (EM) filter located at one end adjacent to the EGR valve, thereby removing particulate material (PM) and carbon oxide or nitrogen oxide of the exhaust gas flowing in the intake line.

That is, in the case of a gasoline engine vehicle using the EGR system, the EM filter is provided as a configuration for removing carbon oxides (carbon) or nitrogen oxides contained in the exhaust gas as the exhaust gas flows in.

However, the EGR system according to the related art is configured to be maintained at a certain opening amount without determining whether or not the EM filter is clogged due to carbon deposits. Accordingly, there is a problem that the exhaust gas does not flow in the intake line through the recirculation line due to the clogging degree of the EM filter.

SUMMARY

The present invention has been made keeping in mind the above problems occurring in the related art, and an object of the present invention is to provide a valve opening control apparatus and method of a gasoline EGR system in which the clogging state of an EM filter is measured and an opening amount of the EGR valve is controlled according to the clogging degree.

An object of the present invention is to provide a valve opening control apparatus and method of a gasoline EGR system in which an opening amount of the EGR valve is controlled in consideration of a load condition of a vehicle and a clogging state of an EM filter.

The objects of the present invention are not limited to the above-mentioned objects, and other objects of the present invention which are not mentioned can be understood by the following description and can be more clearly understood by the embodiments of the present invention. Further, the objects of the present invention can be realized by the means shown in the claims and their combinations.

In order to accomplish the above object, a valve opening control apparatus and method of a gasoline exhaust gas recirculation (EGR) system is configured described below.

The valve opening control apparatus of a EGR system includes a gasoline engine generating driving power through combustion; an intake line through which an intake gas flows into a combustion chamber of the gasoline engine; an exhaust line through which an exhaust gas is discharged from the combustion chamber; a recirculation line branched off from the exhaust line and connected to the intake line; an EGR cooler, positioned in the recirculation line, cooling the exhaust gas flowing in the intake line; an EGR valve configured to control an amount of the exhaust gas flowing in the intake line; an emergency (EM) filter positioned in one end of the EGR valve; and a flow rate regulator configured to control an opening amount of the EGR valve according to a clogging state of the EM filter.

In addition, the flow rate regulator may measure the clogging state of the EM filter. In response to a determination that a clogging degree of the EM filter is less than a first reference value, the flow rate regulator may be configured to maintain the opening amount of the EGR valve at a first open state. In response to a determination that the clogging degree of the EM filter is substantially equal to or greater than the first reference value, the flow rate regulator may be configured to correct the opening amount of the EGR valve to be greater than at the first open state.

In addition, in response to a determination that the clogging degree of the EM filter is substantially equal to or greater than the first reference value and less than the second reference value and when the opening amount of the EGR valve is corrected, the flow rate regulator may be configured to control the opening amount of the EGR valve to linearly increase according to the clogging degree of the EM filter.

In addition, in response to a determination that the clogging degree of the EM filter is substantially equal to or greater than the second reference value and when the opening amount of the EGR valve is corrected, the flow rate regulator may be configured to correct the opening amount of the EGR valve to have a second open state.

In addition, the apparatus may further include a differential pressure sensor configured to measure the clogging state of the EM filter by measuring a pressure across the EGR valve.

In addition, the flow rate regulator may be configured to correct the opening amount of the EGR valve when the number of revolutions of the engine is within a predetermined range.

In addition, the EM filter may be positioned between the EGR valve and the EGR cooler.

In addition, in order to accomplish the above object, a valve opening control method of controlling an EGR system includes: a) determining a condition of an engine load; b) determining, by a flow rate regulator, whether or not a clogging degree of an EM filter is greater than a first reference value when the engine load is equal to or greater than a predetermined value in the step a); c) correcting an opening amount of an EGR valve through the flow rate regulator when the clogging degree of the EM filter is equal to or greater than the first reference value in the step b); and d) checking, by the flow rate regulator, a flow rate of an exhaust gas flowing in a recirculation line through the EGR valve according to the corrected opening amount of the EGR valve.

In addition, the method may further include determining whether or not the clogging degree of the EM filter is less than a second reference value when the clogging degree of the EM filter is equal to or greater than the first reference value in the step b).

In addition, the step c) may include linearly increasing opening amount of the EGR valve according to the clogging degree of the EM filter when the clogging degree of the EM filter is equal to or greater than the first reference value and less than the second reference value.

In addition, the step c) may include maintain the opening amount of the EGR valve at a second open state when the clogging degree of the EM filter is equal to or greater than the second reference value.

In addition, the opening amount of the EGR valve may be maintained at a first open state when the clogging degree of the EM filter is less than the first reference value.

In addition, when the flow rate of the exhaust gas flowing in the recirculation line through the EGR valve according to the corrected opening amount of the EGR valve is less than a predetermined target amount, the step d) may include: d-1) determining whether or not revolutions per minutes (RPM) range of a vehicle engine is changed; and d-2) returning back to the step a) when the RPM range of the vehicle engine is changed in the step d-1) and additionally correcting the corrected opening mount of the EGR valve when the RPM range of the vehicle engine is not changed.

In addition, the step a) may be performed by determining whether or not the condition of the engine load is within an engine RPM range predetermined in a controller.

In addition, the checking the flow rate of the exhaust gas flowing in the recirculation line in the step d) may include measuring a differential pressure applied across the EGR valve using a differential pressure sensor positioned across the EGR valve.

The present invention can obtain the following effects according to the above-described embodiment, the constitution described below, and the combination and use relationship.

Since the opening amount of the EGR valve is controlled in consideration of the clogging state of the EM filter, the present invention has an effect that high fuel efficiency of the vehicle can be achieved even when the EM filter is clogged.

Further, since an output requested by the driver can be provided even when the EM filter is clogged, the present invention has an effect of providing a stable driving performance.

In addition, the present invention has an effect of maintaining an efficient operating performance of the EGR system that performs feedback control according to the corrected opening amount of the EGR valve.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a configuration diagram showing an engine system provided with a valve opening control apparatus of a gasoline EGR system according to an embodiment of the present disclosure;

FIG. 2 is a block diagram of an engine system provided with a valve opening control apparatus of a gasoline EGR system according to an embodiment of the present disclosure;

FIG. 3 is a configuration diagram of a gasoline EGR system according to an embodiment of the present disclosure;

FIG. 4 is a graph showing correction values for controlling an opening amount of an EGR valve in a valve opening control apparatus of a gasoline EGR system according to an embodiment of the present disclosure;

FIG. 5 is a graph illustrating fuel efficiency comparison and estimation of a vehicle using a valve opening control apparatus of a gasoline EGR system according to an embodiment of the present disclosure;

FIG. 6 is a flowchart illustrating a valve opening control method of controlling a gasoline EGR system according to an embodiment of the present disclosure; and FIG. 7 is a flowchart of a process of checking an exhaust gas flow rate in a valve opening control method of controlling a gasoline EGR system according to an embodiment of the present disclosure.

DETAILED DESCRIPTION

Hereinafter, embodiments of the present disclosure will be described in detail with reference to the accompanying drawings. The embodiments of the present disclosure can be modified in various forms, and the scope of the present disclosure should not be construed as being limited to the following embodiments. This embodiment is provided to more fully explain the present disclosure to those skilled in the art.

Also, the terms "part", "unit", "module", the like, which are described in the specification, mean a unit for processing at least one function or operation, which can be implemented as hardware, software, or a combination of hardware and software.

FIG. 1 is a conceptual diagram showing a configuration of an engine system provided with an EGR system 100 (hereinafter referred to as an "engine system") according to an embodiment of the present disclosure. FIG. 2 is a block diagram showing a configuration of the engine system according to an embodiment of the present disclosure.

As shown in FIGS. 1 and 2, the engine system according to an embodiment of the present disclosure includes an engine 20, a turbocharger 50, an exhaust gas recirculation (EGR) system 100, a flow rate regulator 160, and a controller 200.

The engine 20 includes a plurality of combustion chambers 21 that generate driving force through fuel combustion. The engine 20 is provided with an intake line 10 through which an intake gas supplied to the combustion chamber 21 flows and an exhaust line 30 through which an exhaust gas discharged from the combustion chamber 21 flows.

The exhaust line 30 is provided with an exhaust gas post-treatment device 40 for removing various harmful substances contained in the exhaust gas discharged from the combustion chamber 21. An embodiment of the present disclosure is provided such that a warm up catalytic converter (WCC) post-treatment device 40 is used to remove nitrogen oxides, carbon deposits, and particulate matter (PM) in the exhaust gas.

The turbocharger 50 compresses the intake gas (outside air and recirculation gas) flowing in through the intake line 10 and supplies the compressed air to the combustion chamber 21. The turbocharger 50 includes a turbine 51 provided in the exhaust line 30 to be rotated by the exhaust gas discharged from the combustion chamber 21 and a compressor 52 rotated in cooperation with the turbine 51 to compress the intake gas.

The EGR system 100 includes a recirculation line 120, an EGR cooler 110, an EGR valve 140, an EM filter 130, and a flow rate regulator 160.

The recirculation line 120 branches off from the exhaust line 30 at the rear end of the turbocharger 50 and joins the intake line 10. The EGR cooler 110 is positioned in the recirculation line 120 and cools the recirculation gas (exhaust gas) flowing through the recirculation line 120. A flow regulator 160 is installed in the recirculation line 120 to regulate the amount of exhaust gas flowing through the recirculation line 120. That is, the flow rate regulator 160 is configured such that an opening amount of the EGR valve may be controlled in cooperation with the controller 200.

The EGR valve 140 that is capable of being opened and closed to control a flow rate of a recirculation gas (exhaust gas) flowing into the EGR system 100 is configured in one end of the EGR cooler 110, and the EM filter 130 for removing residual carbon oxides, nitrogen oxides, and PM contained in the recirculation gas (exhaust gas) is configured in one end of the EGR valve 140.

That is, the EM filter 130 is configured to filter out foreign matter when a component such as a catalyst is broken.

More preferably, a differential pressure sensor 150 is positioned across the EGR valve 140 or across the EM filter 130, in order to measure a pressure applied across the EGR valve 140 (EM filter) and thus determine the clogging state and the clogging degree of the EM filter 130. In addition, the flow rate regulator 160 is configured to receive data on the clogging state and the clogging degree of the EM filter 130 to control the opening amount of the EGR valve 140.

More preferably, the flow rate regulator 160 of the present disclosure may use the controller 200 located in the vehicle, and may control the opening amount of the EGR valve 140 in consideration of the number of revolutions per minutes (RPM) of the engine 20 of the vehicle, a load applied to the vehicle, and the like, in addition to the clogging state and the clogging degree of the EM filter 130.

In one embodiment of the present disclosure, the EGR system 100 may be configured to be operated with the number of revolutions of the engine 20 being at a minimum of 2000 RPM and at a maximum of 4000 RPM. Further, the EGR system 100, which is typically configured in the gasoline engine 20, is configured to operate more frequently when the engine 20 is at a low RPM than at a high RPM. However, since a range in which the EGR system 100 is operated may be changed according to the driving area of the vehicle, the EGR system 100 may be operated in a range of the number of revolutions of the engine 20 that is predetermined in the controller 200 or the flow rate regulator 160.

The present disclosure is configured such that the clogging state of the EM filter 130 is determined at the range of revolutions of the engine 20 in which the EGR system 100 is operated, whereby the flow rate regulator 160 may determine the clogging degree of the EM filter 130 by measuring the pressure applied to the EGR valve 140.

FIG. 3 illustrates a configuration of the EGR system 100 located in the recirculation line 120 according to an embodiment of the present disclosure.

The recirculation line 120, branched off from the exhaust line 30 and connected to the intake line 10, is configured to be fluidly connected to an EGR cooler 110 and an EM filter 130. An EGR valve 140 that is capable of being opened and closed to control the flow rate of a recirculation gas (exhaust gas) is configured in one end of the EGR cooler 110 is located. An EM filter 130 for removing residual carbon oxide, nitrogen oxides, and PM contained in the recirculation gas (exhaust gas) is configured in at least one end of the EGR valve 140.

More preferably, in one embodiment of the present disclosure, the EM filter 130 is located between the EGR cooler 110 and the EGR valve 140.

The flow rate regulator 160 of the present disclosure is configured to control the opening amount of the EGR valve 140 from the clogging state of the EM filter 130. In one embodiment, the differential pressure sensor 150 is configured to be positioned across the EGR valve 140 so that the clogging state and the clogging degree of the EM filter 130 may be determined based on a detection result of the differential pressure sensor 150. In another embodiment of the present disclosure, the differential pressure sensor 150 may be configured to be positioned across the EM filter 130.

The differential pressure sensor 150 as described above measures the differential pressure applied across the EGR valve 140 (EM filter 130) and corrects the opening amount of the EGR valve 140 when the measured differential pressure is equal to or greater than a predetermined value.

FIG. 4 shows a correction value for controlling the opening amount of the EGR valve 140 according to the clogging degree of the EM filter 130 according to an embodiment of the present disclosure.

The EGR system 100 of the present disclosure is configured to be operated when the range of revolutions of the engine 20 is maintained between 2000 RPM and 4000 RPM, so that the flow rate regulator 160 determines the clogging state of the EM filter 130 under the condition that the EGR system 100 is operated.

The flow rate regulator 160 is configured to compensate for the opening amount of the EGR valve 140 when it is measured that the clogging degree of EM filter 130 is greater than the first reference value through the pressure measured through the differential pressure sensor 150. More preferably, the flow rate regulator 160 performs correction such that the opening amount of the EGR valve 140 is linearly increased in a state that the clogging degree of the EM filter 130 is equal to or greater than the first reference value and less than the second reference value.

In summary, the flow rate regulator 160 is configured such that the EGR valve 140 maintains a first open state when the clogging degree of the EM filter 130 is less than the first reference value; the opening amount of the EGR valve 140 is linearly increased when the clogging degree of the EM filter 130 is equal to or greater than the first reference value and less than the second reference value; and the EGR valve 140 maintains a second open state when the clogging degree of the EM filter 130 is equal to or greater than the second reference value.

In an embodiment of the present disclosure, the first reference value means that the clogging degree of the EM filter 130 is 30%, and the second reference value means that the clogging degree of the EM filter 130 is 80%.

Further, in an embodiment of the present disclosure, the second reference value means that the clogging degree of the EM filter 130 is 65% under the condition of 4000 RPM or more. In this case, the flow rate regulator 160 is configured such that the EGR valve 140 maintains the second open state.

As described above, in the present disclosure, the first reference value and the second reference value may be varied according to the load and the number of revolutions of the engine 20.

In addition, the second open state is provided by doubling the opening amount of the EGR valve 140 as compared with the first open state, and here, the second open state may be the maximum open state of the EGR valve 140.

However, the first open state and the second open state mentioned above in one embodiment of the present disclosure may vary depending on the operating environment of the EGR system 100. In addition, the correction value for controlling the opening amount of the EGR valve 140 may vary depending on the clogging degree of the EM filter 130.

FIG. 5 is a graph illustrating fuel efficiency comparison and estimation of the vehicle through the valve opening control apparatus of the gasoline EGR system 100 of the present disclosure.

As shown in the figure, when the EGR valve is controlled to be maintained in the second open state in a case that the EM filter 130 maintains the second reference value (clogged greater than 80%) through the valve opening control apparatus of the gasoline EGR system 100 according to the present disclosure, there is an effect of increasing fuel efficiency thereof by about 10% compared with the EGR system 100 without the valve opening control apparatus of the gasoline EGR system 100.

As described above, the valve opening control apparatus of the gasoline EGR system 100 according to the present disclosure is configured such that the opening amount of the EGR valve 140 is controlled under the condition of the EM filter 130 being clogged when the EGR system 100 is operated, whereby there is an effect that fuel efficiency of the vehicle is increased.

FIGS. 6 and 7 according to an embodiment of the present disclosure illustrate flowcharts of a valve opening control method of controlling the gasoline EGR system 100.

The valve opening control method of controlling the gasoline EGR system 100 according to the present disclosure includes a step of determining a load condition applied to the vehicle (S100).

In the step of determining the load condition, the number of revolutions of the engine 20 and the amount of load applied to the engine 20 are determined. In one embodiment of the present disclosure, it is determined whether or not the number of revolutions of the engine 20 in which the EGR system 100 is operated is 2000 RPM to 4000 RPM.

In the step, when the load of the engine 20 is equal to or greater than a predetermined value, the flow rate regulator 160 determines whether or not the clogged state of the EM filter 130 is equal to or greater than the first reference value (S200) to determine the clogged state and the clogging degree of the EM filter 130.

The clogging state and the clogging degree of the EM filter 130 may be determined by the differential pressure applied across the EGR valve 140 or the EM filter 130. Accordingly, when the EM filter 130 is determined to be equal to or greater than the first reference value, the differential pressure that is equal to or greater than the reference pressure stored in the controller 200 is generated.

The method includes correcting the opening amount of the EGR valve 140 through the flow rate regulator 160 when the clogging state and the clogging degree of the EM filter 130 are equal to or greater than the first reference value (exhaust gas) (S300), and checking a flow rate of the recirculation gas (exhaust gas) flowing in the intake line 10 along the recirculation line 120 according to the corrected opening amount (S400).

In the step S400 of checking the flow rate of the recirculation gas (exhaust gas), since an EGR gas temperature sensor is located between the EGR cooler 110 and the exhaust line 30, it is possible to measure the flow rate of the recirculation gas flowing through the recirculation line 120 by measuring the temperature of the recirculation gas flowing in the discharge stage of the EGR cooler 100.

Further, in the step of determining the clogging state of the EM filter 130 by the flow rate regulator 160, when the clogging degree of the EM filter 130 is equal to or greater than the first reference value, it is determined whether or not the clogging degree of the EM filter 130 is less than the second reference value (S200).

That is, the method is configured such that the EGR valve 140 maintains the first open state when the clogging degree of the EM filter 130 is less than the first reference value; the amount of opening of the EGR valve 140 is linearly increased when the clogging degree of the EM filter 130 is equal to or greater than the first reference value and less than the second reference value; and the EGR valve 140 maintains the second open state when the clogging degree of the EM filter 130 is equal to or greater than the second reference value.

The opening amount of the EGR valve 140 may be corrected according to a map stored in the controller 200 of the vehicle or the correction value may be computed through the flow rate regulator 160 and the controller 200 on the basis of the differential pressure measured through the differential pressure sensor 150.

A step of checking the flow rate of the recirculation gas (exhaust gas) flowing in the recirculation line 120 according to the corrected opening amount of the EGR valve 140 (S400) is performed. When the differential pressure measured in the differential pressure sensor 150 is substantially the same as the predetermined value (S410), the opening amount of the EGR valve 140 is maintained (S411) and the logic is terminated (S412).

When the differential pressure measured by the differential pressure sensor 150 is not substantially equal to the predetermined value (S410), it is determined whether or not the RPM during traveling of the vehicle has been changed (S420). When the RPM during traveling of the vehicle is changed, (S421), the opening amount of the EGR valve 140 is maintained (S421) and the load condition applied to the vehicle at the initial stage is measured (S100).

However, when the differential pressure measured by the differential pressure sensor 150 is not substantially equal to the predetermined value (S410) and the RPM during traveling of the vehicle is not changed (S420), the opening amount of the EGR valve 140 is additionally corrected (S422) and it is determined whether or not the differential pressure measured by the differential pressure sensor 150 is substantially equal to the predetermined value (S410).

As described above, the opening amount of the EGR valve 140 is controlled in consideration of the travelling condition of the vehicle and the clogging state of the EM filter 130 through the valve opening control method of controlling the gasoline EGR system 100 of the present disclosure, and the amount of recirculation gas (exhaust gas) flowing in the recirculation line 120 is controlled to be increased in accordance with the corrected opening amount of the valve 140.

The controller 200 and/or the flow rate regulator 160 may include a processor, a memory and/or a storage coupled to the processor. The processor may be a central processing unit (CPU) or a semiconductor device that processes instructions stored in the memory and/or the storage. Each of the memory and the storage may include various types of volatile or nonvolatile storage media. For example, the memory may include a read only memory (ROM) and a random access memory (RAM). Thus, the operations of the methods or algorithms described in connection with the embodiments disclosed in the specification may be directly implemented with a hardware module, a software module, or a combination of the hardware module and the software module, which is executed by the processor. The software module may reside on a non-transitory, or transitory, storage medium (i.e., the memory and/or the storage) such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor. The processor may read out information from the storage medium and may write information in the storage medium. Alternatively, the storage medium may be integrated with the processor. The processor and storage medium may reside in an application specific integrated circuit (ASIC).

The foregoing detailed description illustrates the present disclosure. Furthermore, the foregoing is intended to illustrate and explain the preferred embodiments of the present disclosure, and the present disclosure may be used in various other combinations, modifications, and environments. That is, it is possible to make changes or modifications within the scope of the concept disclosed in the present specification, equivalents to the disclosure and/or the scope of the art or knowledge of the present disclosure. The described embodiments are intended to be illustrative of the best mode for carrying out the technical idea of the present disclosure and various changes may be made in the specific applications and uses of the present disclosure. Therefore, the detailed description of the disclosure is not intended to limit the disclosure to the disclosed embodiments. It is also to be understood that the appended claims are intended to cover further embodiments.

What is claimed is:
1. A valve opening control apparatus of a gasoline exhaust gas recirculation (EGR) system, the apparatus comprising:
 a gasoline engine generating driving power through combustion;
 an intake line through which an intake gas flows into a combustion chamber of the gasoline engine;
 an exhaust line through which an exhaust gas is discharged from the combustion chamber;
 a recirculation line branched off from the exhaust line and connected to the intake line;
 an EGR cooler, positioned in the recirculation line, cooling the exhaust gas flowing in the intake line;
 an EGR valve configured to control an amount of the exhaust gas flowing in the intake line;
 an emergency (EM) filter positioned in one end of the EGR valve; and
 a flow rate regulator configured to control an opening amount of the EGR valve according to a clogging state of the EM filter,
 wherein the flow rate regulator measures the clogging state of the EM filter,
 in response to a determination that a clogging degree of the EM filter is less than a first reference value, the flow rate regulator is configured to maintain the opening amount of the EGR valve at a first open state,
 in response to a determination that the clogging degree of the EM filter is equal to or greater than the first reference value, the flow rate regulator is configured to correct the opening amount of the EGR valve to be greater than at the first open state, and
 in response to a determination that the clogging degree of the EM filter is equal to or greater than the first reference value and less than the second reference value and when the opening amount of the EGR valve is corrected, the flow rate regulator is configured to control the opening amount of the EGR valve to linearly increase according to the clogging degree of the EM filter.

2. The apparatus of claim 1, wherein, in response to a determination that the clogging degree of the EM filter is equal to or greater than the second reference value and when the opening amount of the EGR valve is corrected, the flow rate regulator is configured to correct the opening amount of the EGR valve to have a second open state.

3. The apparatus of claim 1, further comprising:
 a differential pressure sensor configured to measure the clogging state of the EM filter by measuring a pressure across the EGR valve.

4. The apparatus of claim 1, wherein the flow rate regulator is configured to correct the opening amount of the EGR valve when the number of revolutions of the engine is within a predetermined range.

5. The apparatus of claim 1, wherein the EM filter is positioned between the EGR valve and the EGR cooler.

6. A valve opening control method of controlling an EGR system, the method comprising:
 (a) determining a condition of an engine load;
 (b) determining, by a flow rate regulator, whether or not a clogging degree of an EM filter is greater than a first reference value when the engine load is equal to or greater than a predetermined value in the step (a);
 (c) correcting an opening amount of an EGR valve through the flow rate regulator when the clogging degree of the EM filter is equal to or greater than the first reference value in the step (b);
 (d) checking, by the flow rate regulator, a flow rate of an exhaust gas flowing in a recirculation line through the EGR valve according to the corrected opening amount of the EGR valve; and (e) determining whether or not the clogging degree of the EM filter is less than a second reference value when the clogging degree of the EM filter is equal to or greater than the first reference value in the step (b), wherein the step (c) comprises linearly increasing the opening amount of the EGR valve according to the clogging degree of the EM filter when the clogging degree of the EM filter is equal to or greater than the first reference value and less than the second reference value.

7. The method of claim 6, wherein the step (c) further comprises maintaining the opening amount of the EGR valve at a second open state when the clogging degree of the EM filter is equal to or greater than the second reference value.

8. The method of claim 6, wherein the opening amount of the EGR valve is maintained at a first open state when the clogging degree of the EM filter is less than the first reference value.

9. The method of claim 6, wherein, when the flow rate of the exhaust gas flowing in the recirculation line through the EGR valve according to the corrected opening amount of the EGR valve is less than a predetermined target amount, the step £d) includes:
   (d-1) determining whether or not revolutions per minutes (RPM) range of a vehicle engine is changed; and
   (d-2) returning back to the step a) when the RPM range of the vehicle engine is changed in the step (d-1) and additionally correcting the corrected opening mount of the EGR valve when the RPM range of the vehicle engine is not changed.

10. The method of claim 6, wherein the step (a) is performed by determining whether or not the condition of the engine load is within an engine RPM range predetermined in a controller.

11. The method of claim 6, wherein the checking the flow rate of the exhaust gas flowing in the recirculation line in the step (d) comprises measuring a differential pressure applied across the EGR valve using a differential pressure sensor positioned across the EGR valve.

12. A valve opening control method of controlling an EGR system, the method comprising:
   (a) determining a condition of an engine load;
   (b) determining, by a flow rate regulator, whether or not a clogging degree of an EM filter is greater than a first reference value when the engine load is equal to or greater than a predetermined value in the step (a);
   (c) correcting an opening amount of an EGR valve through the flow rate regulator when the clogging degree of the EM filter is equal to or greater than the first reference value in the step (b); and
   (d) checking, by the flow rate regulator, a flow rate of an exhaust gas flowing in a recirculation line through the EGR valve according to the corrected opening amount of the EGR valve, wherein, when the flow rate of the exhaust gas flowing in the recirculation line through the EGR valve according to the corrected opening amount of the EGR valve is less than a predetermined target amount, the step (d) includes:
   (d-1) determining whether or not revolutions per minutes (RPM) range of a vehicle engine is changed; and
   (d-2) returning back to the step (a) when the RPM range of the vehicle engine is changed in the step (d-1) and additionally correcting the corrected opening mount of the EGR valve when the RPM range of the vehicle engine is not changed.

\* \* \* \* \*